DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED NOVEMBER 23, 1971

892 O.G. 1210

T892,008

DISPERSE ACID AND VAT OR SULFUR DYEING OF POLYESTER-POLYAMIDE BLEND IN A POLYESTER-CELLULOSE BLEND USING DRY HEAT AND FABRIC SO DYED

William Fred Ibach, Wilmington, Del., assignor to E. I. du Pont de Nemours and Company, Wilmington, Del.

Filed Nov. 13, 1970, Ser. No. 89,224
Int. Cl. D06p *3/82*
U.S. Cl. 8—21 B
1 Sheet Drawing. 15 Pages Specification

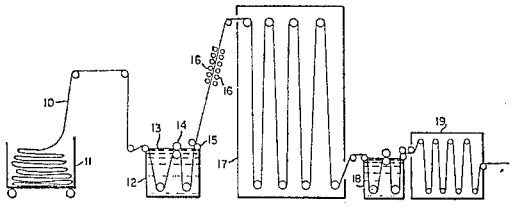

A dyed fabric which has substantial freedom from frosting and is unusually durable when rendered press-free by resin treatment has two sets of crossing and interlocked yarns of which one set protrudes to form a wear surface and the other set is submerged with respect to the wear surface. The protruding set is a blend of polyester and polyamide fibers and the submerged set is a blend of 50–70% by weight polyester fibers with 50–30% cellulosic fibers. Cross-dyeing may be accomplished in a continuous, high-speed single-pass process in which the fabric is impregnated in bath 13 with an aqueous acid dye and an aqueous dispersion of disperse dye, flash dried at 16 to remove at least 25% of the water, exposed for 15 to 90 seconds to dry heat at 205–225° C. in oven 17 to fix the dye, submerged in an aqueous bath 18 for dyeing cellulosic fibers, passed through steamer 19, and then through conventional finishing treatments.

Nov. 23, 1971 W. F. IBACH T892,008
DISPERSE ACID AND VAT OR SULFUR DYEING OF POLYESTER-POLYAMIDE BLEND IN A POLYESTER-CELLULOSE BLEND USING DRY HEAT AND FABRIC SO DYED
Filed Nov. 13, 1970
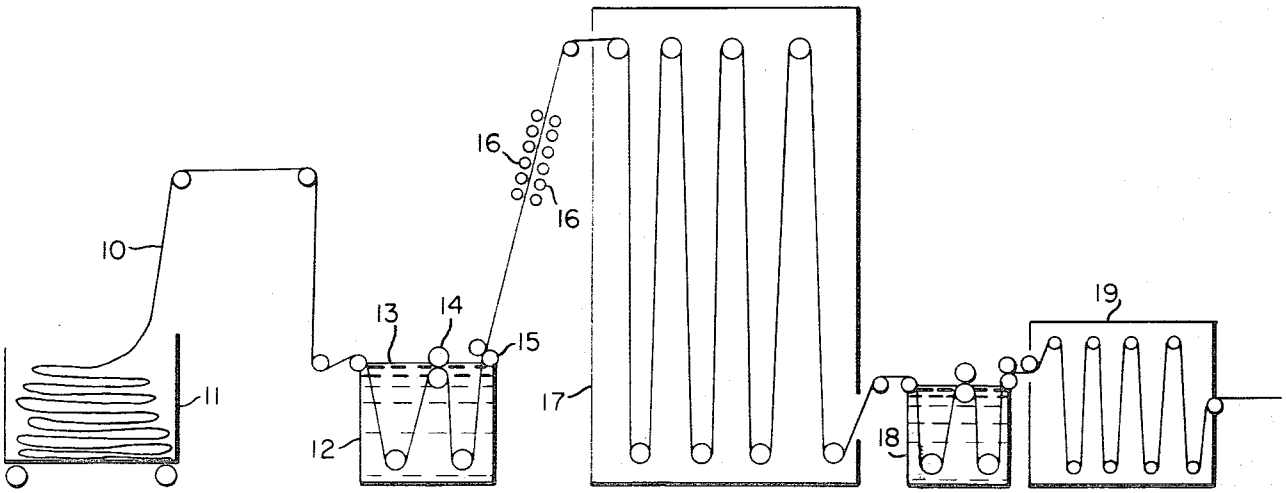
INVENTOR
WILLIAM FRED IBACH
BY Morris E. Reckman
ATTORNEY